Dec. 2, 1969  K. REICH  3,481,614
SELF-CENTERING CHUCK
Filed June 27, 1966  2 Sheets-Sheet 2
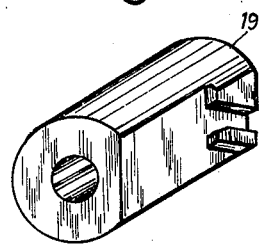
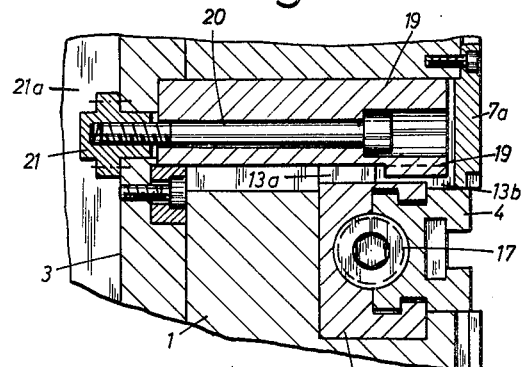
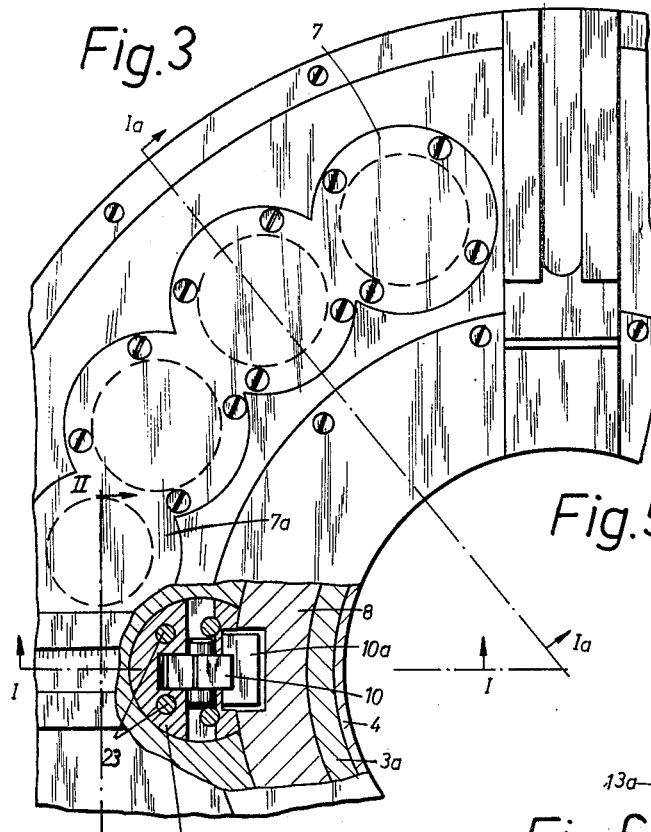
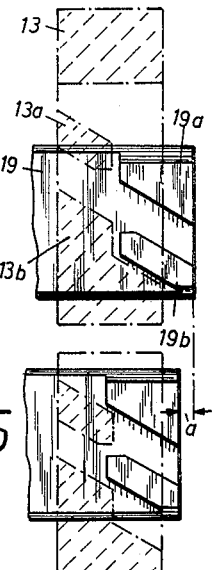
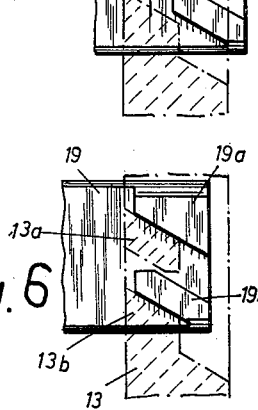

United States Patent Office 3,481,614
Patented Dec. 2, 1969

3,481,614
SELF-CENTERING CHUCK
Kurt Reich, Dusseldorf, Germany, assignor to Paul Forkardt Kommanditgesellschaft, Dusseldorf, Germany
Filed June 27, 1966, Ser. No. 560,656
Claims priority, application Germany, June 29, 1965, F 46,462
Int. Cl. B23b 31/16
U.S. Cl. 279—4         7 Claims

ABSTRACT OF THE DISCLOSURE

A self-centering power operated jaw chuck, in which continued axial movement of a main annular driving member successively produces two distinct radial motions of jaws including long rapid approach and short clamping stroke with a large force, and vice versa. An ancillary driving member urged by springs to follow the main member on first part of stroke, is effective through slow-to-fast bell crank levers imparting fast motion to jaws, until wedge teeth of bars, rigidly connected to main member, enter corresponding toothing of jaws and produce slow motion with large force, leaving the ancillary member to lag idly. Return movement of the main member first unclamps jaws, and after catching up with the ancillary member positively returns the latter, which through the bell cranks rapidly retracts the jaws.

---

The present invention relates to a self-centering chuck, especially to a front end chuck with central drive.

Frequently it is desirable to be able to cause the clamping jaws to carry out a fast movement at a long stroke and a chucking movement with large forces. Chucks have been suggested according to which the wedge means employed for adjusting the jaws are provided with different wedge surfaces in order to be able to carry out a fast stroke and also a separate clamping stroke. In this connection, however, it is difficult to obtain the necessary clamping pressure.

It is, therefore, an object of the present invention to provide a self-centering chuck which will overcome the above mentioned drawback.

It is another object of this invention to provide a self-centering chuck with a central pressure drive by means of which it will be possible to perform a long fast stroke and also a clamping stroke which is independent of said fast stroke and can be carried out with large forces.

These and other objects and advantages of the invention will appear more clearly from the following specification in connection with the accompanying drawings, in which:

FIG. 2 represents a tangential section taken along the line II—II of FIG. 3.

FIG. 3 is a partial view of a portion of the chuck according to the invention and shows a portion of the chuck in section.

FIGS. 4 to 6 illustrate different positions of the lower jaws.

FIG. 7 is a perspective view of a wedge bar.

Figure 1:
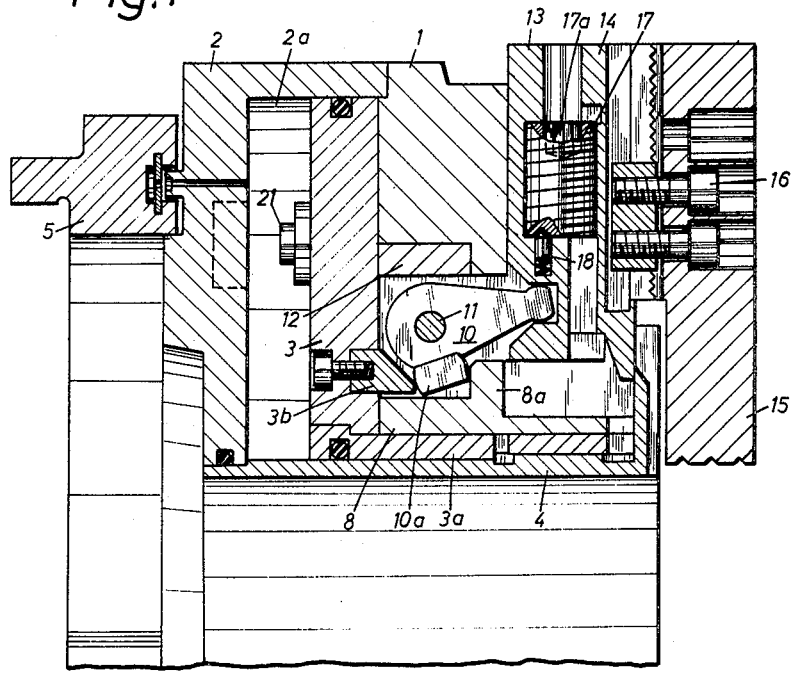
FIG. 1 is a cross section through a portion of a chuck according to the invention, said section being taken along the line I—I of FIG. 3.

The self-centering chuck with a central pressure drive, which is adapted to impose upon the clamping jaws sequentially a fast movement at a long stroke and a clamping movement with large forces, is in conformity with the present invention, characterized in that for the two types of movements there are provided two axially movable member which by transmission means respectively pertaining to said two members are adapted at different transmission ratios to act upon the clamping jaws while the fast stroke annular member is adjustable in the clamping direction independently by springs or a fluid pressure operable member and is displaceable by the clamping stroke member for releasing the chuck. In this way a simple structure will be obtained while the magnitude of the fast stroke is entirely independent of the force to be obtained by the clamping stroke.

For purposes of carrying out a chucking operation, the spring-loaded fast stroke annular member may through a step-up angle lever be connected with the lower jaws of the chuck. The angle levers are tiltable by the clamping stroke member for releasing the jaws. The clamping stroke piston may be connected with axially displaceable wedge bars the teeth of which engage lateral teeth of the lower jaw. In order to be able to adjust the jaws in a simple manner with regard to the work piece, the lower jaws and their base jaws may be provided with an adjusting spindle.

Referring now to the drawings in detail, the front end chuck comprises a chuck body 1 having its rear side provided with a cylinder 2. Displaceably mounted in the cylinder chamber 2a of cylinder 2 is a clamping piston 3 which by means of its sleeve 3a is displaceable on the guiding pipe 4. The pressure medium, such as compressed air, is introduced into the cylinder chamber 2a in a manner known per se by an air feeding ring 5 which is adapted to be fastened to the headstock of a machine tool, as for instance a lathe. This pressure medium serves for releasing the chuck. For purposes of clamping or tightening the chuck, there are provided a plurality of spring packets 6 of which, in conformity with the showing of FIG. 1a, three spring packets each are arranged behind a cover 7 between the four jaws of the chuck.

Figure 1A:
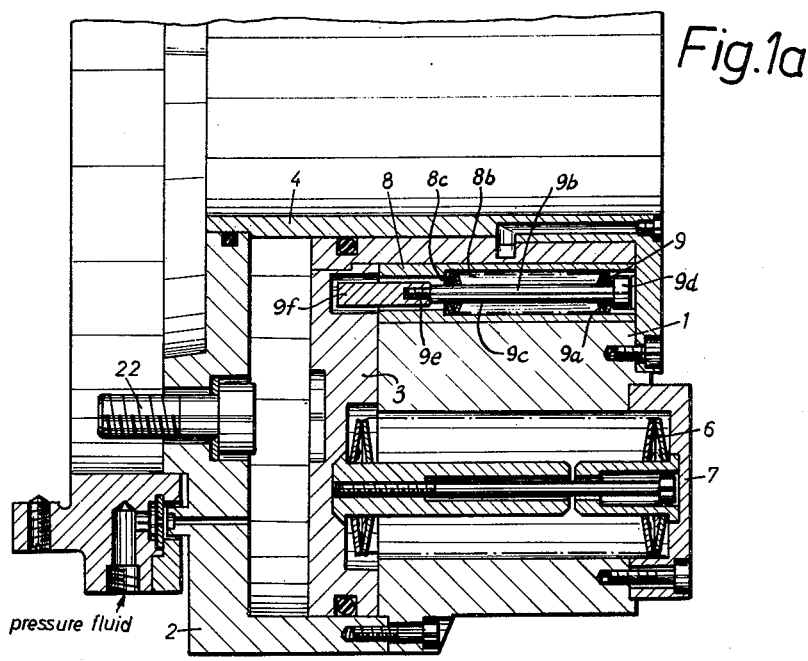
FIG. 1a is a section taken along the line Ia—Ia of FIG. 3.

Slidably arranged on sleeve 3a of the clamping stroke piston is a fast stroke hull or annular member 8 (FIG. 1) which is likewise adapted to be moved into its clamping position by a spring packet 9 (FIG. 1a). When four jaws are provided, there are also four spring packets 9. The spring packet 9 comprises individual disc springs 9a, which are stacked upon the shaft 9b of a bolt 9c having a head 9d. The threads 9e of the bolt 9c are screwed into a connector portion 9f of the clamping piston 3. The disc spring packet 9 fits into an axial bore 8b of fast-stroke hull 8 and lies against a shoulder 8c with one of its ends, while the other end thereof engages the bolt head 9d.

The fast stroke spring urged hull or annular member 8, when four jaws are provided, acts upon four angle levers 10. Each angle lever 10 is keyed to a shaft 11 which in its turn is journalled in an insert member or bearing means 12 which latter is inserted into the chuck body 1 (FIGS. 1 and 3). By means of screws 23, the insert member 12 is fixedly connected to the chuck body 1. The shorter lever arm of the angle lever 10 is equipped with an abutment piece 10a which is adapted to be acted upon by a collar 8a of the fast stroke annular member. The longer lever arm of angle lever 10 engages a lower jaw 13 (FIG. 1) guided in the chuck body 1. This lower jaw 13 primarily carries a secondary base jaw portion 14 to which the upper jaw 15 is connected in a manner known per se, for instance by means of screws 16. Between the lower jaw 13 and the base jaw 14 there may be provided an adjusting spindle 17 in order to be able to adjust the base jaw portion 14 relative to the lower jaw portion 13. The spindle 17 is adapted to be turned by means of a wrench which may be introduced into the hexagonal recess 17a. Spindle 17 is secured in its respective position for instance by a spring-loaded arresting bolt 18.

FIG. 2 illustrates that by means of bolts 20, wedge bars 19 are connected to the clamping stroke piston 3. The said bolts 20 are screwed into threaded sleeves 21 which in their turn are connected to the clamping stroke piston 3 for instance by screws indicated by the center lines 21a. The wedge bars 19 are inserted from the front side of the chuck and are covered toward the outside by the cover portion 7a (FIGS. 2 and 3). These wedge bars 19 are equipped with lateral teeth 19a and 19b (FIGS. 4 to 6). These teeth are adapted to mesh with tooth spaces of teeth 13a and 13b of the lower jaw 13.

The operation of the chuck according to the invention is as follows. When through the air feeding ring 5 air is discharged from the cylinder chamber 2a, the spring packets 6 and 9 become effective. Spring packets 6 displace the clamping stroke piston according to FIG. 1 toward the left and thus displace the wedge bars 19 likewise toward the left. At the same time, however, also the fast stroke annular member 8 has been displaced toward the left whereby the angle lever 10 is tilted in clockwise direction. As a result thereof, the lower jaw 13 has been moved radially inwardly. The base position between the wedge bar 19 and the lower jaw is indicated in FIG. 4, whereas FIG. 5 indicates a position in which the two members have carried out the axial stroke a. When the members continue their movements, the lower jaw is displaced further so that during the further displacement of the fast stroke annular member, the teeth 19a and 19b can enter the tooth spaces between the teeth 13a and 13b on jaw 13 so that the inclined clamping surfaces are adapted to convey forces upon the clamping surfaces of the lower jaws as indicated in FIG. 6.

When the chuck is to be relieved, the left side of the clamping stroke piston 3 is acted upon by compressed air or another pressure fluid. Piston 3 will then be displaced toward the right and during its stroke carries along the fast stroke annular member 8. The clamping stroke piston can advantageously be equipped with special abutments 3b which act upon the abutment 10a of angle lever 10 and tilt the same in order to return the lower jaw 13 to its starting position.

The chuck may by means of screws 22 be connected in customary manner with the headstock (not illustrated). It is also to be understood that instead of employing springs for the clamping movement of the two members, it is also possible to employ a pressure fluid operable piston.

It is, of course, to be understood that the present invention is, by no means, limited to the particular construction shown in the drawings but also comprises any modifications within the scope of the appended claims.

What I claim is:

1. A self-centering chuck which includes: a chuck body, a plurality of jaw means exclusively for clamping, said jaw means being supported by said chuck body and being radially movable thereon from a retracted position to a clamping position and vice versa, a first annular fast stroke member and a second power operable piston member respectively operatively connected to said jaw means independently of each other and at a different transmission ratio, said first annular member and said second piston member being movable in a first direction for respectively and sequentially effecting a fast radial movement of said jaw means toward their clamping position and operable independently of said fast movement to clamp said jaw means with large force into clamping position, said second piston member and said first annular member respectively being movable in a second direction for respectively unclamping said jaw means and effecting a fast retraction stroke thereof to their retracted position, and spring means respectively acting upon said first and second members and respectively continuously urging said first and second members collectively to move in their first direction, said first annular member being actuated through said second piston member for closing said jaw means into clamping relationship.

2. A self-centering chuck which includes: a chuck body, a plurality of jaw means exclusively for clamping, said jaw means being supported by said chuck body and being radially movable thereon from a retracted position to a clamping position and vice versa, a first annular fast stroke member and a second power operable piston member respectively operatively connected to said jaw means independently of each other and at a different transmission ratio, said first annular member and said second piston member being movable in a first direction for respectively and sequentially effecting a fast radial movement of said jaw means toward their clamping position and operable independently of said fast movement to clamp said jaw means with large force into clamping position, said second piston member and said first annular member respectively being movable in a second direction for respectively unclamping said jaw means and effecting a fast retraction stroke thereof to their retracted position, and spring means respectively acting upon said first and second members and respectively continuously urging said first and second members collectively to move in their first direction.

3. A self-centering chuck which includes: a chuck body, a plurality of jaw means exclusively for clamping, said jaw means being supported by said chuck body and being radially movable thereon from a retracted position to a clamping position and vice versa, a first annular fast stroke member and a second power operable piston member respectively operatively connected to said jaw means independently of each other and at a different transmission ratio, said first annular member and said second piston member being movable in a first direction for respectively and sequentially effecting a fast radial movement of said jaw means toward their clamping position and operable independently of said fast movement to clamp said jaw means with large force into clamping position, said second piston member and said first annular member respectively being movable in a second direction for respectively unclamping said jaw means and effecting a fast retraction stroke thereof to their retracted position, and bell crank angle lever means operatively connected to said jaw means and respectively operable by said second piston member when the latter is moving in its second direction and by said first annular member when the latter is moving in its first direction for respectively effecting a fast radially outward and radially inward movement of said jaw means.

4. A chuck according to claim 2, which includes wedge means connected to said second piston member, and in which said jaw means includes teeth operable by said wedge means during movement of said second piston member in its first direction for exerting radially inwardly directed pressure upon said jaw means to thereby exert a clamping action thereupon.

5. A self-centering chuck which includes: a chuck body, a plurality of jaw means each including a first jaw and a second jaw exclusively for clamping, said jaw means being supported by said chuck body and being radially movable thereon from a retracted position to a clamping position and vice versa, a first annular fast stroke member and a second power operable piston member respectively operatively connected to said jaw means independently of each other and at a different transmission ratio, said first annular member and said second piston member being movable in a first direction for respectively and sequentially effecting a fast radial movement of said jaw means toward their clamping position and operable independently of said fast movement to clamp said jaw means with large force into clamping position, said second piston member and said first annular member respectively being movable in a second direction for respectively unclamping said jaw means and effecting a fast retraction stroke thereof to their retracted position, adjustable spindle means accessible radially between each first and second jaw of each jaw means for steplessly adjusting the relative position of each adjacent first and second jaw, and spring loaded arresting bolt means mounted in said first jaw and securing said spindle means in its respective position.

6. A chuck according to claim 3, which includes a plurality of bearing means mounted in said chuck and respectively pivotally supporting said bell crank angle lever means.

7. A chuck according to claim 3, in which said second piston member is provided with abutment means for engaging with said bell crank angle lever means when said second piston member is moving in its second direction.

References Cited

UNITED STATES PATENTS

| 1,454,121 | 5/1923 | Lavoie | 279—121 |
| 1,469,360 | 10/1923 | Cullen | 279—121 X |
| 2,158,058 | 5/1939 | Godfriaux | 279—4 |
| 2,219,851 | 10/1940 | Sloan | 279—110 |
| 2,323,091 | 6/1943 | Johnston | 279—4 |
| 2,695,176 | 11/1954 | Work | 279—4 |

ROBERT C. RIORDAN, Primary Examiner

J. C. PETERS, Assistant Examiner

U.S. Cl. X.R.

279—119, 121